April 3, 1951 M. RANDALL 2,547,139
CHLORINATION OF HYDROCARBONS
Filed March 8, 1946
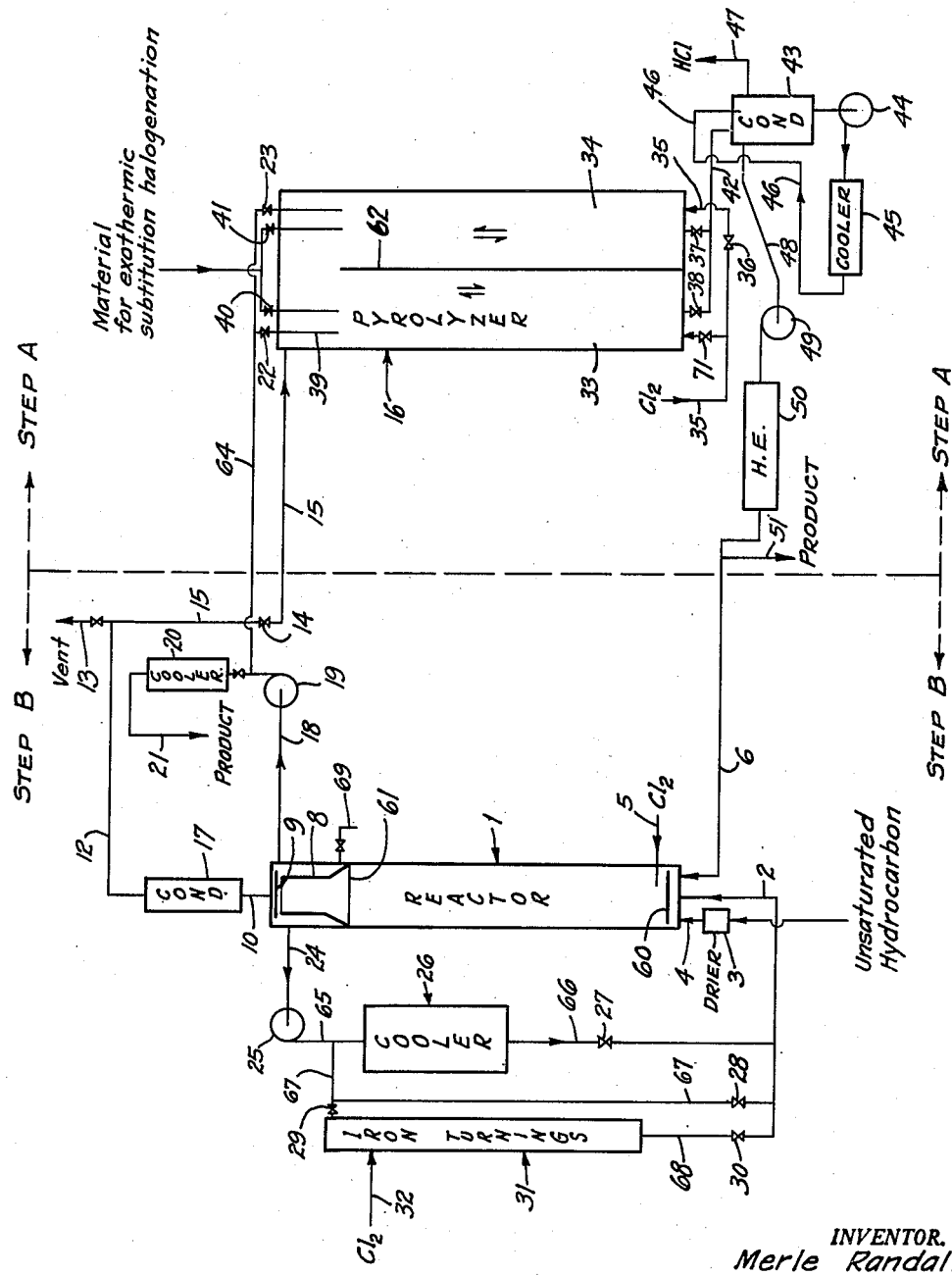
INVENTOR.
Merle Randall
BY
ATTORNEY Patented Apr. 3, 1951

2,547,139

UNITED STATES PATENT OFFICE 2,547,139

CHLORINATION OF HYDROCARBONS

Merle Randall, Berkeley, Calif.

Application March 8, 1946, Serial No. 653,218

15 Claims. (Cl. 260—654)

This invention relates to the manufacture of chlorinated hydrocarbons, and more particularly to the manufacture of trichloroethylene and perchloroethylene.

The principal difficulty encountered in the chlorination of hydrocarbons, or of partially chlorinated hydrocarbons, is the removal of the heat of chlorination. Likewise, the principal difficulty encountered in the dehydrochlorination reaction by which hydrochloric acid gas is split out of a polychlorinated hydrocarbon or a dissociation reaction wherein chlorine or a carbon chloride is split out is the transfer of heat into the reactants.

The term "dissociation" is used to represent dechlorination and dehydrochlorination reactions of the type shown in the following equations wherein either chlorine or carbon chloride, e. g., carbon tetrachloride, or hydrogen chloride is split off:

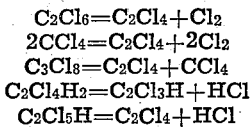

$$C_2Cl_6 = C_2Cl_4 + Cl_2$$
$$2CCl_4 = C_2Cl_4 + 2Cl_2$$
$$C_3Cl_8 = C_2Cl_4 + CCl_4$$
$$C_2Cl_4H_2 = C_2Cl_3H + HCl$$
$$C_2Cl_5H = C_2Cl_4 + HCl$$

I have discovered that the chlorination of a hydrocarbon, or of a partially chlorinated hydrocarbon can be advantageously performed stepwise, as follows:

*Step A.—Simultaneous substitution and dissociation*

The substitution of a hydrogen atom by the halogen atom to form hydrogen chloride gas and a chlorinated hydrocarbon is performed at from 200 to 700° C., in the presence of a chlorinated hydrocarbon capable of being dissociated into an unsaturated chlorinated hydrocarbon, with the disengagement of either chlorine, carbon chloride, or hydrochloric acid gas, the proportion of the hydrocarbon or partially chlorinated hydrocarbon undergoing substitution to the chlorinated hydrocarbon undergoing such dissociation being so adjusted that the net heat is neither exothermic nor endothermic and the total or over-all reaction is substantially iso-thermal.

*Step B.—Addition chlorination*

Addition of halogen to an unsaturated hydrocarbon or partially chlorinated unsaturated hydrocarbon is performed in the presence of (1) an inert solid substance, (2) a rapidly circulating stream (the circulate) of the product of said addition of chlorine to unsaturated hydrocarbon, or partially chlorinated hydrocarbon, and (3) in the presence of a catalyst, if this be necessary or desirable, at a temperature sufficiently high to ensure the addition of chlorine in the presence of the rapidly moving stream of product (the circulate) which serves to carry off the heat of the addition of halogen to the double and triple bonds of the unsaturated hydrocarbon or unsaturated chlorinated hydrocarbon, the circulate being removed and cooled to an appropriate operating temperature before being returned to the reactor.

In Step B, sufficient of the product is removed from the circulate to maintain the volume of circulate approximately constant. This removed product of Step B can be fractionated for other use or introduced directly into Step A as the feed of saturated chlorinated hydrocarbon capable of being dissociated into an unsaturated chlorinated hydrocarbon. Likewise the product of Step A can be either fractionated as product for other uses, or may be fed to Step B as the partially chlorinated unsaturated hydrocarbon.

The net effect of Steps A and B is to perform a high temperature chlorination of hydrogen or a substitution chlorination of the saturated hydrocarbon or a partially saturated chlorinated hydrocarbon under essentially adiabatic conditions without heat transfer at the high temperature and to perform a highly exothermic addition of chlorine to an unsaturated hydrocarbon or to the product of Step A, under such conditions that the temperature of reaction is controlled and the heat removed in easily available steel interchangers.

It is a principal object of my invention to carry out the removal of the heat of the addition of chlorine to an aliphatic hydrocarbon in an apparatus which need be constructed only of ordinary steel. This is accomplished by carrying on the addition reaction in a substantially anhydrous rapidly moving stream of the liquid product of the reaction and in the presence of a solid material to promote rapid mixing of the reactants and the rapidly moving liquid stream.

The heat of the addition reaction between chlorine and an unsaturated aliphatic hydrocarbon, or a partially chlorinated unsaturated aliphatic hydrocarbon, raises the temperature of the circulate. This heat can be removed in an all-iron interchanger of a conventional type when the circulate is in a substantially anhydrous state. The corrosion is negligible and the apparatus for carrying out the chlorination is thus greatly simplified. The circulate can be maintained in a substantially anhydrous state by the addition of anhydrous ferric chloride, the controlled production of anhydrous ferric chloride in the apparatus by the reaction of chlorine and finely divided iron, or by the re-circulation of ferric chloride sludge when this sludge is in a substantially anhydrous condition.

Another of the principal objects of my invention is preparation of vinyl chloride, trichloroethylene or perchloroethylene; I prepare these by the dissociation of a polychlorinated saturated hydrocarbon, which ordinarily takes place at from 200° to 600° C. supplying the heat necessary to the dissociation, by carrying on, simultaneously with the dissociation, the chlorination of hydrogen or of an unsaturated or saturated aliphatic hydrocarbon which may be partially chlorinated. The amount of heat supplied in the pyrolytic reactor (Step A) by the chlorination reaction is adjusted to supply all the heat necessary for the preheating and vaporization of the reactants and the dissociation of the polychlorinated hydrocarbon.

When the amount of chlorine introduced in Step A is limited to that required to maintain the reactor at the optimum temperature for the dehydrochlorination, it is possible to dispense with heat transfer in the dissociating vessel and the reactor can be built of refractory lined steel so long as the temperature of the steel does not exceed about 100° C. If desired, a steel tank can be lined with brick and the material known by the trade name of Pyroflex, or Tygon or any similar lining which is not affected at or near 75° C. by chlorinated hydrocarbons, chlorine, hydrochloric acid and moisture.

Some substitution of chlorine for hydrogen in the circulate may take place with the evolution of hydrochloric acid gas. Such substitution does not substantially interfere with the process of my invention. Likewise, a stream containing both saturated and unsaturated hydrocarbons, or partially chlorinated hydrocarbons, as well as hydrogen and saturated hydrocarbons and other gases (as, for example, the product of the thermal cracking of propane) may be chlorinated in Step B with little or no chlorination of the hydrogen and saturated hydrocarbons. The saturated hydrocarbons and hydrochloric acid may pass through to the pyrolyzer of Step A, where they are thermally chlorinated, or if in excess of that needed to supply the heat of dehydrochlorination in the pyrolyzer, may be vented from the system.

According to Patent 2,139,219, perchloroethylene is produced by passing a mixture of tetrachloroethane and chlorine over a catalyst at 150°–400° C. I have found that if one supplies chlorine in an amount limited to that sufficient to furnish a heat of chlorination equivalent to the heat of dehydrochlorination, a mixture consisting of approximately 30% trichloroethylene and 70% perchloroethylene is obtained. Since the patentees supplied sufficient chlorine to completely chlorinate any trichloroethylene produced by the dehychlorination of the tetrachloroethane, they must, of necessity, have made some undisclosed provision for disposition of the excess heat of chlorination.

I have discovered that the proportion of trichloroethylene in the reaction products from the operation in the aforementioned patent can be substantially increased by carrying on a chlorination of hydrogen along with the dehydrochlorination of tetrachloroethane. To accomplish this, tetrachloroethane and chlorine are introduced into a reaction chamber, or pyrolyzer, heated to about 400° C., and then hydrogen is introduced. The proportion of hydrogen to chlorine is so adjusted that the amount of heat generated by the chlorination of the hydrogen by chlorine and some of the produced trichloroethylene by chlorine is just equal to the heat of dehydrochlorination of the tetrachloroethane and pentachloroethane, and that needed to maintain the chamber at the desired temperature.

It is immaterial whether the perchloroethylene is formed by the chlorination of trichloroethylene and the dehydrochlorination of the formed pentachloroethane, or by some other mechanism.

As examples of various additional typical applications of my invention, I cite the following:

(1) Acetylene is chlorinated in Step B whereby tetrachloroethane is formed. Tetrachloroethane and chlorine and ethane are fed into Step A whereby a mixture consisting predominately of trichloro- and perchloroethylene is formed. This mixture is fed back into Step B whereby the trichloroethylene is converted into pentachloroethane and the perchloroethylene to hexachloroethane. This mixture is in turn fed back to Step A, along with chlorine and ethane, whereby it is converted predominately into perchloroethylene with some trichloroethylene. The perchloroethylene is fed back into Step A, whereby a portion of the perchloroethylene is converted to hexachloroethane and the product in turn is fed back to Step A, whereby perchloroethylene is the chief product. This operation, when practiced continuously, requires only a small amount of acetylene and a large amount of ethane as the source of the carbon.

(2) Acetylene is chlorinated in Step B to form tetrachloroethane which is fed to Step A along with chlorine and ethylene whereby trichloroethylene is predominately formed. The trichloroethylene is fed back to Step B and chlorinated to pentachloroethane. The pentachloroethane is fed to Step A, along with chlorine and some dichloroethane, previously prepared in accordance with Step B, to produce a mixture of perchloroethylene, trichloroethylene, etc. Trichloroethylene and perchloroethylene are formed from acetylene, ethylene and chlorine as a net result.

(3) A mixture of acetylene and ethylene is chlorinated in Step B. The tetrachloroethane and dichloroethylene formed are fed into Step A, along with chlorine and there is obtained a mixture of trichloroethylene and perchloroethylene.

The combination of Steps A and B, either in a single or a multiple chlorination, is a valuable feature of my invention, for the use of these steps, in combination, enables both saturated and unsaturated aliphatic hydrocarbons to be used efficiently and effectively to produce various desirable chlorinated hydrocarbons as end products with an efficient use of chlorine and hydrocarbons.

The invention includes other objects and features of advantage some of which, together with the foregoing, will appear hereinafter.

To accomplish and attain the above, I have used successfully an apparatus and flow sheet shown diagrammatically in the single figure in the drawing. This apparatus can be suitably varied by those skilled in the art.

In the drawing, the apparatus to the left of the dotted line represents Step B and that to the right, Step A. For convenience, I will first discuss that employed in practice of Step B. This includes reactor 1 which may be of iron, or iron lined with a suitable corrosion resistant material such as acid-proof brick: the reactor is preferably filled with crushed barite of from 3 to 6 mesh. The use of barite is highly advantageous since its density is relatively great and it is not displaced easily by the liquid flowing past it and because it does not erode easily. Larger and smaller sizes can be used but I have found that 3 to 6 mesh gives the most satisfactory operation of the reactor. Other inert materials such as quartz, crushed brick, crushed glass, stoneware, Raschig rings, Berl saddles, etc., may be used in place of crushed barite.

A stream of circulate is led into the bottom of reactor 1 through pipe 2. The hydrocarbon such as ethylene, acetylene, or a mixture of ethylene and acetylene, or ethylene and acetylene mixed with hydrogen and other hydrocarbons, or partially chlorinated unsaturated hydrocarbon is passed through a drier 3 and pipe 4 to the bottom of the reactor, being distributed at a level of approximately 3" above a perforated plate 60 which serves to distribute the flow of circulating product and to support the solid packing in the reactor, e. g., barite.

The circulate introduced through pipe 2 is at such a temperature as will induce a smooth reaction with chlorine which is introduced through pipe 5 in proper proportion to react with unsaturated hydrocarbon introduced through pipe 4. In the case of acetylene and chlorine, I have found that temperatures between 50° and 70° are satisfactory, but I prefer to operate at an initial temperature of 60°. With ethylene and chlorine to form dichloroethane, temperatures between 0° C. and 25° C. are satisfactory, but I have found 15° to 20° C. to be the most desirable. It is convenient to maintain the ratio between chlorine and unsaturated hydrocarbon by means of an automatic ratio flow controller.

When one is chlorinating the product from Step A, this is introduced through pipe 6 in a predetermined ratio to the volume of chlorine introduced. The reaction between chlorine and an unsaturated hydrocarbon, or partially chlorinated unsaturated hydrocarbon, takes place in the reactor 1 smoothly with little or no substitution chlorination taking place.

The heat of the reaction is taken up by the circulate and its temperature may raise from 2° to 20° C., but I have found it desirable to circulate a sufficient amount of circulate product to limit the temperature rise between the bottom and top of the reactor to approximately 2° to 4° C.

The circulate, and any gas which rises through the column, pass through the screen 61 which serves to retain the contacting agent and then through the inverted funnel shaped chimney 8 and against the splash plate 9 which is supported from the reactor 1 and is spaced from the entrance to pipe 10 and the end of the chimney 8. Solid materials, such as partially hydrated ferric chloride, settle between the chimney and the reactor and are drawn off through line 69. Liquid and gases are separated at the top of the reactor and the gas passes through pipe 10 to the reflux condenser 17 and thence to the vent pipe 12 where it is either allowed to escape to the atmosphere through the pipe 13, or is passed to Step A, through valve 14 and pipe 15 to a convenient intermediate point in the pyrolyzer 16 to recover any values in the form of hydrocarbons, chlorine, or chlorinated hydrocarbons uncondensed in the vent gas.

Part of the chlorinated hydrocarbons in the vent gas refluxes in condenser 17 under the influence of the cooling medium circulated in this condenser. The excess of product over that required to maintain a constant volume of circulating product through reactor 1 is taken off through pipe 18 and pump 19 from which it is led either through a cooler 20 and thence through pipe 21 as a product for refining or for use or through pipe 64 to valves 22 or 23 on the pyrolyzer in Step A. The product from pipe 21 may contain ferric chloride.

The circulating product is withdrawn from the top of the reactor through pipe 24 and is forced by pump 25 and pipe 65 to a cooler 26 where some or all of the circulating product is cooled to the proper temperature necessary to maintain the reaction in reactor 1. The cooler 26 is used as a heater when starting to bring the circulate to the proper reacting temperature. The proper temperature is conveniently maintained by an automatic controller through valve 27 in line 66 and valve 28 in by-pass line 67 which allow the by-passing of sufficient hot circulating product to regulate the temperature of the circulate introduced through pipe 2.

Ferric chloride is a convenient catalyst for the addition reaction of chlorine. It can be added as such in anhydrous form or it can be formed in situ by the action of chlorine on the iron in the equipment or upon a mass of iron scrap provided for this purpose. Ferric chloride is unique in that it takes up water present and maintains the reaction and the system anhydrous. By the proper obvious adjustment of valve 29 in line 67 and valve 30 in line 68, the flow of circulate is diverted through iron turnings contained in reactor 31, where they are treated with a portion of chlorine introduced in pipe 32.

Ferric chloride sludge may settle outside the chimney 8, and may be withdrawn through valve 69, discarded, or added to sludge settled from the product withdrawn through pipes 21 or 64 (settler not shown). The withdrawn sludge, if in a substantially anhydrous condition, may be returned to the system as required to maintain the proper moisture content and the ferric chloride content of the system. Anhydrous ferric chloride may be added as required from any outside source.

Turning to Step A and pyrolyzer 16, this may be constructed of a vertical steel shell lined with a coating resistant to chlorinated solvents, chlorine and hydrochloric acid, the shell being brick-lined to reduce the temperature of the steel wall. The reactor is conveniently divided by a partition wall 62 into chambers 33 and 34 extending from the bottom to near the top of the pyrolytic chamber. The two portions of the pyrolytic chamber are filled with suitable checkerwork brick (not shown) and may contain a suitable catalyst for the pyrolytic reaction.

Ordinarily the chambers are operated at temperatures between 200° and 700° C. and cyclicly, that is, the gases flowing in the chamber are periodically reversed. For the purposes of illustration, one can consider that the gases are flowing downward in chamber 33 and upward in chamber 34. Under these conditions, chlorine is admitted through pipe 35 and valve 36, valve 37 and valve 71 being closed and valve 38 open. As the chlorine passes through chamber 34, it is heated to reaction temperature and as it passes over into chamber 33, it is mixed with a stream of product from reactor 1, or an equivalent source, sprayed onto the checkerwork by pipe 39 under the control of valve 22, valves 23 and 41 being closed and valves 22 and 40 being open.

Hydrogen, an aliphatic hydrocarbon, or a partially chlorinated hydrocarbon capable of exothermic substitution chlorination is admitted through valve 40, valve 41 being closed. The simultaneous substitution chlorination of this and the dissociation of the product of reactor 1, proceed adiabatically in chamber 33, the resultant gases being discharged through valve 38 and pipe 42, to the condenser 43 where the gases meet a jet of cooled product of the condensation furnished by pump 44, cooler 45, and introduced as a jet by pipe 46.

The hydrochloric acid formed during the substitution chlorination and dehydrochlorination taking place in reactor 16, is separated in condenser 43, and escapes through pipe 47. Any hydrocarbon vapors in the hydrochloric acid gas are separated by any convenient means, and the anhydrous hydrochloric acid is either used in other processes or is absorbed in water to form aqueous hydrochloric acid.

The excess of product over that needed as circulate, is withdrawn from separator 43, through pipe 48, and pump 49, to the heat exchanger 50 where it is cooled or heated to the proper temperature for introduction into reactor 1, of Step B, or is cooled and sent to storage through pipe 51.

At the end of the cycle described above, when the checkers at the bottom of chamber 34 have cooled by reason of the introduction of cool chlorine through valve 35, appropriate obvious valve changes are made so as to reverse the direction of travel of the gases in chambers 33 and 34 of the pyrolyzer. That is, valves 36, 22, 40 and 38 are closed and valves 71, 23, 41 and 37 are opened.

If the chlorine is preheated, as by heat exchange with the products issuing from the reaction zone, or if the reaction zone is first suitably brought up to temperature and additional exothermic hydrocarbon or hydrogen introduced, the cyclic reactor need not be used.

Other obvious modifications of the details of the apparatus of my invention may be made without departing from the spirit thereof. Thus a material of substantially equivalent composition to the product issuing from reactor 1 of Step B may be withdrawn from storage for introduction into pyrolyzer 16 through valves 22 or 23. Likewise a product approximating the composition of the product from the pyrolyzer 16 may be fed through pipe 6 into reactor 1. As an example, acetylene and chlorine may be fed into an apparatus of the construction of reactor 1, thus forming acetylenetetrachloride. This may be introduced into pyrolyzer 16 with chlorine through pipe 35 and dichloroethane, prepared in another reactor similar to reactor 1, may be introduced through valves 40 or 41, as the material capable of undergoing substitution chlorination.

If desired, ethylene and acetylene, in the proper proportions for use in the pyrolyzer may be introduced simultaneously through pipe 3, in which case it is unnecessary to introduce the dichloroethane through valves 40 or 41. Similarly the necessary hydrocarbon to be pyrolyzed may be added to the stream from reactor 1 before introduction through valves 22 or 23.

The following specific examples are set forth by way of illustration of Step A:

Example 1

Tetrachloroethane vapor and chlorine, in the ratio of 2.22 mols to 1 mol of chlorine, was introduced into a catalyst chamber charged with bone charcoal at 400° C. An overall yield of 95% of the organic material charged was recovered as a mixture of 36 percent of trichloroethylene and 64 percent of perchloroethylene, with traces of pentachloroethane and hexachloroethane.

Example 2

Tetrachloroethane, hydrogen and chlorine in the ratio of 2.8 mols of tetrachloroethane to one each of hydrogen and chlorine were introduced into a catalyst chamber packed with bone charcoal and maintained at 400° C. An overall recovery of 87% was obtained of organic materials. The product was a mixture of 1% dichloroethylene, 65% trichloroethylene and 34% perchloroethylene.

Example 3

1500 ml. chlorine and 500 ml. of liquid tetrachloroethane per hour were fed into a pyrolyzer at 400°, with a packing consisting of fragmented diatomaceous earth impregnated with 15% of its weight of cupric chloride. 300 ml./min. of ethylene were also introduced. 97.5% of the material fed into the furnace was recovered as an organic fraction consisting of 23.7% trichloroethylene; 61.5% perchloroethylene; 1% tetrachloroethane; 7.8% pentachloroethane and 2.1% hexachloroethane.

The proportion of perchloroethylene recovered in the above operation can be increased by increasing the proportion of chlorine and slightly decreasing the proportion of tetrachloroethane fed to the pyrolyzer. Normally the ratio of ethylene to tetrachloroethane is about 1 to 5, but the ratio may vary between rather large limits. The proportion of chlorine is varied so as to balance the heat of chlorination against that of the heat of dehydrochlorination.

Example 4

When methane is fed in the proportion of approximately 1 mol of methane to 10 mols of tetrachloroethane with enough chlorine to carry on the chlorination and supply heat of reaction equivalent to the heat of dehydrochlorination, one recovers a mixture of perchloroethylene, trichloroethylene and chloro-substituted methanes, a mixture of chloroform and carbon tetrachloride.

Natural gas was used as a source of methane. Chlorine at the rate of 1000 ml./min., and vaporized tetrachloroethane at the rate of 400 ml. of liquid/hr. were fed into the pyrolyzer at 420° C. with a recovery of 99.7%. 250 ml./min. of natural gas were introduced and utilized in the reaction. The organics analyzed:

| Substance: | Weight per cent |
|---|---|
| Chloroform | 3.5 |
| Carbontetrachloride | 6.0 |
| Trichloroethylene | 32.0 |
| Perchloroethylene | 34.0 |
| Tetrachloroethane | 17.0 |
| Pentachloroethane | 5.0 |
| Hexachloroethane | 1.0 |
| | 98.5 |

Example 5

When propane is used in place of hydrogen, or ethylene, or methane in the above, the chlorination of propane results in a product which dissociates into carbon tetrachloride and perchloroethylene, in accordance with the reactions:

$$C_3H_8 + 8Cl_2 = C_3Cl_8 + 8HCl$$
$$C_3Cl_8 = CCl_4 + C_2Cl_4$$

1000 ml./min. of chlorine along with 400 ml./hr. of tetrachloroethane were fed at 400° C. into a pyrolyzer containing cupric chloride on diatomaceous earth fragments. 150 ml./min. of gaseous propane were introduced into the hot gases. The product analyzed as follows:

| Substance: | Weight per cent |
|---|---|
| Chloroform | 1.0 |
| Carbontetrachloride | 3.5 |
| Trichloroethylene | 26.0 |
| Perchloroethylene | 32.8 |
| Tetrachloroethylene | 31.2 |
| Pentachloroethane | 4.0 |
| Hexachloroethane | 1.0 |
| | 99.5 |

*Example 6*

900 ml. of chlorine per minute and 650 ml. per hour of the above liquid product made in Example 9 was vaporized and fed into the pyrolytic chamber packed with cupric chloride on diatomaceous earth at 400° C. 150 ml./min. of propane gas were also introduced into the hot gases. There resulted a product consisting of substantially the following:

| Substance: | Weight per cent |
|---|---|
| Trichloroethylene | 9.5 |
| Perchloroethylene | 78.2 |
| Tetrachloroethane | 5.3 |
| Pentachloroethane | 3.5 |
| Hexachloroethane | 0. |
| | 96.5 |

*Example 7*

400 ml. of chlorine per minute, along with 400 ml. per hour of the liquid mix used in Example 6 was vaporized and fed into the pyrolyzer. 300 ml./min. of propane was introduced. The product analyzed:

| Substance: | Weight percent |
|---|---|
| Chloroform | 1.5 |
| Carbontetrachloride | 7.0 |
| Trichloroethylene | 14.0 |
| Perchloroethylene | 57.5 |
| Tetrachloroethane | 13.5 |
| Pentachloroethane and hexachloroethane | 6.0 |
| | 99.5 |

*Example 8*

Tetrachloroethane, mixed hexanes, and chlorine in the ratio of 1 mol of tetrachloroethane, 0.07 mol of hexanes, and 0.91 mol of chlorine, were fed into the pyrolyzer chamber. A 95% yield of product analyzing 41% trichloroethylene, 25% perchloroethylene, 25% unreacted tetrachloroethane, and 5% hexachloroethane, was recovered.

The following are illustrative of Step B:

*Example 9*

The mixed product from a number of the above runs of the pyrolysis of tetrachloroethane, Step A, of the following composition:

| | Percent |
|---|---|
| Trichloroethylene | 21 |
| Perchloroethylene | 55 |
| Tetrachloroethane | 20 |
| Hexachloroethane | 4 | was fed into the primary chlorinator first mentioned above, along with some acetylene and chlorine. There was obtained a material of the following analysis:

| Substance: | Weight percent |
|---|---|
| Trichloroethylene | 0.5 |
| Perchloroethylene | 15.0 |
| Tetrachloroethane | 26.0 |
| Pentachloroethane | 27.0 |
| Hexachloroethane | 31.0 |
| | 99.5 |

From the above it is apparent that the product of the pyrolysis of Step A, consisting largely of unsaturated aliphatic hydrocarbons, may be fed to the primary chlorinator in Step B whereby the chlorinated ethylene derivatives are transformed into chlorinated ethane derivatives, the heat of chlorination being removed by the current of liquid product circulating through the primary chlorinator, and that the product of this chlorination may, in turn, be fed into the pyrolysis chamber in Step A and where, for example, the hexachloroethane is dissociated into chlorine and perchloroethylene and where the polychlorinated ethanes are dissociated by the simultaneous chlorination of hydrogen or an aliphatic hydrocarbon without the transfer of heat into the reactor 16 from an external source.

A portion of the pyrolyzed product can be removed to a kettle, treated with lime to neutralize the dissolved hydrochloric acid and to convert any undehydrochlorinated tetrachloroethane and pentachloroethane to trichloroethylene and perchloroethylene, respectively, and the product separated by fractional distillation whereby chloroform, carbontetrachloride, trichloroethylene and perchloroethylene are recovered, the hexachloroethane being returned to the product from the first primary reactor 1 to be decomposed in the pyrolyzer 16.

Dichloroethane may be used in place of ethane or ethylene or a lower chlorinated propane or a lower chlorinated methane may also be used for introduction into the mixture of chlorine and product from the first or primary reactor.

While I have mentioned the use of methane, ethane, propane, and chloro-substitution products of these, and acetylene, ethylene and chloro-addition products of these, compounds containing more than 3 carbon atoms and up to 6 carbon atoms can also be used as long as the proportion of these higher hydrocarbons is kept low enough that the product in the primary chlorinator remains a liquid at the temperature of the chlorination.

I claim:
1. A process for addition chlorination which comprises introducing separately into a reaction zone at a temperature conducive to said chlorination, chlorine and a material selected from the group consisting of the unsaturated aliphatic hydrocarbons and chlorohydrocarbons having from 2 to 6 carbon atoms, and anhydrous ferric chloride in an amount sufficient to catalyze the reaction and maintain the system substantially anhydrous and separating, externally cooling, and returning to the reaction zone a portion of the liquid product sufficient to remove the heat of reaction.

2. A process for addition chlorination which comprises introducing separately into a mass of inert non-metallic solid particles contained in a reaction zone, at a temperature conducive to said chlorination, chlorine and a material selected from the group consisting of the unsaturated aliphatic hydrocarbons and chlorohydrocarbons having from 2 to 6 carbon atoms, and anhydrous ferric chloride in an amount sufficient to catalyze the reaction and maintain the system substantially anhydrous and separating, externally cooling, and returning to the reaction zone a portion of the liquid product sufficient to remove the heat of reaction.

3. The process of claim 2 wherein the inert non-metallic solid particles are granulated barite.

4. The process of claim 2 wherein the material fed into the reaction zone is contained in a gas produced by the cracking of hydrocarbons.

5. The process of claim 2 wherein the material fed into the reaction zone is acetylene.

6. A process for addition chlorination which comprises introducing separately into a first reaction zone at a temperature conducive to said chlorination, chlorine and a material selected from the group consisting of the unsaturated aliphatic hydrocarbons and chlorohydrocarbons having from 2 to 6 carbon atoms and separating, externally cooling, and returning to the first reaction zone a portion of the liquid product sufficient to remove the heat of reaction, the reaction being catalyzed and maintained substantially anhydrous by separating a second portion of the liquid product, and passing said second portion together with chlorine through a second reaction zone containing iron particles whereby anhydrous ferric chloride is produced, and returning the said second portion together with the ferric chloride formed to the first reaction zone.

7. A process for addition chlorination which comprises circulating through a reaction zone containing a mass of inert non-metallic solid particles, a liquid stream of the product of the addition chlorination, introducing into said stream in said reaction zone chlorine and a material selected from the group consisting of the unsaturated aliphatic hydrocarbons and chlorohydrocarbons having from 2 to 6 carbon atoms, and anhydrous ferric chloride in an amount sufficient to catalyze the reaction and maintain the system substantially anhydrous; and separating from, externally cooling and returning to said reaction zone a portion of said stream to regulate the temperature of said reaction zone.

8. The process of claim 7 wherein (a) the material subjected to addition chlorination is acetylene, (b) the product of the addition chlorination is tetrachlorethane, (c) the product of the addition chlorination is circulated upwardly through the reaction zone and, (d) the inert non-metallic solid particles are granulated barite.

9. The process of claim 7 wherein (a) the material subjected to addition chlorination is ethylene, (b) the product of the addition chlorination is dichlorethylene, (c) the product of the addition chlorination is circulated upwardly through the reaction zone and (d) the inert non-metallic solid particles are granulated barite.

10. A multistage process for the chlorination of hydrocarbons comprising two essential steps, namely, (A) an addition chlorination step which comprises introducing separately into a mass of non-metallic inert solid particles contained in a first reaction zone a material selected from the group consisting of the unsaturated aliphatic hydrocarbons and chlorohydrocarbons containing from 2 to 6 carbon atoms and anhydrous ferric chloride in an amount sufficient to catalyze the reaction and maintain the system substantially anhydrous, and separating, externally cooling and returning to the reaction zone a portion of the liquid product sufficient to remove the heat of reaction, thereby producing partially and completely chlorinated hydrocarbons having from 2 to 6 carbon atoms, and (B) a simultaneous chlorine substitution and pyrolytic dissociation step which comprises carrying on simultaneously in the same reaction zone (1) an exothermic chlorine substitution reaction between chlorine and a compound selected from the group consisting of hydrogen and the aliphatic hydrocarbons and partially chlorinated aliphatic hydrocarbons having from 1 to 6 carbon atoms and (a) an endothermic pyrolytic dissociation of a chlorinated aliphatic hydrocarbon having from 2 to 6 carbon atoms, the quantity of reactants employed in exothermic reaction (1) being substantially equal to that required to provide by reaction the heat dissipated by endothermic reaction (2) whereby step (B) is rendered substantially adiabatic; the products of both step (A) and step (B) being suitable starting materials for either of said steps (A) and (B), said steps (A) and (B) being carried out in any desired sequence.

11. The process of claim 10 wherein the inert non-metallic solid particles are granulated barite.

12. A process for preparing chlorinated hydrocarbons which comprises effecting an addition chlorination reaction by introducing separately into a mass of non-metallic inert particles contained in a first reaction zone, chlorine and a material selected from the group consisting of the unsaturated aliphatic hydrocarbons and chlorohydrocarbons containing from 2 to 6 carbon atoms, and anhydrous ferric chloride in an amount sufficient to catalyze the reaction and maintain the system substantially anhydrous, separating, externally cooling, and returning a first portion of the liquid product of said addition chlorination reaction sufficient to remove the heat of reaction; withdrawing a second portion of the liquid product of said addition chlorination reaction and introducing it together with chlorine and a compound selected from the group consisting of hydrogen and the aliphatic hydrocarbons and the partially chlorinated aliphatic hydrocarbons containing 1 to 6 carbon atoms into a second reaction zone, the amount of chlorine and said compound being substantially equal to that required to provide by reaction the heat necessary to effect the pyrolytic dissociation of the liquid product of the first reaction zone, whereby the overall reaction in said second reaction zone is substantially isothermal, and recovering the product.

13. A process for preparing chlorinated hydrocarbons which comprises effecting addition chlorination by introducing separately into a mass of non-metallic inert particles contained in a first reaction zone, chlorine and a material selected from the group consisting of the unsaturated aliphatic hydrocarbons and chlorohydrocarbons containing from 2 to 6 carbon atoms, and anhydrous ferric chloride in an amount sufficient to catalyze the reaction and maintain the system substantially anhydrous.

separating, externally cooling, and returning a first portion of the liquid product of said addition chlorination sufficient to remove the heat of reaction, withdrawing a second portion of the liquid product of said addition chlorination and introducing it together with chlorine and a compound selected from the group consisting of hydrogen and the aliphatic hydrocarbons and the partially chlorinated aliphatic hydrocarbons containing 1 to 6 carbon atoms into a second reaction zone, the amount of chlorine and said compound being substantially equal to that required to provide by reaction the heat necessary to effect the pyrolytic dissociation of the liquid product of the first reaction zone, whereby the overall reaction in said second reaction zone is substantially isothermal, introducing a portion of the product of said second reaction zone together with chlorine into said first reaction zone to effect further addition chlorination and recovering the product thereby obtained.

14. A substantially isothermal process for the production of a mixture of chlorinated hydrocarbons containing at least about 30% trichloroethylene which comprises essentially introducing into a reaction zone as original reactants (a) chlorine, (b) tetrachloroethane, (c) a material selected from the group consisting of hydrogen, the aliphatic hydrocarbons having from 1 to 6 carbon atoms and the partially chlorinated aliphatic hydrocarbons other than tetrachloroethane having from 1 to 6 carbon atoms, and effecting concurrently in said reaction zone (1) an exothermic chlorine substitution reaction and (2) an endothermic dehydrochlorination reaction, the reactants (a), (b), and (c) being so proportioned that the heat available from the exothermic reaction (1) is substantially completely utilized to maintain the endothermic reaction (2), there being present in the reaction mixture at least about 1 mol of reactant (c) for each 14 mols of tetrachloroethane.

15. A susbtantially isothermal process for the production of chlorinated hydrocarbons which comprises introducing into the same reaction zone as original reactants (a) chlorine, (b) a partially chlorinated aliphatic hydrocarbon having from one to six carbon atoms and (c) a substantial quantity of a material selected from the group consisting of hydrogen, the aliphatic hydrocarbons having from 1 to 6 carbon atoms and the partially chlorinated aliphatic hydrocarbons having from 1 to 6 carbon atoms different from reactant (b) and effecting concurrently in said reaction zone (1) an exothermic chlorine substitution reaction, and (2) an endothermic dehydrochlorination reaction, the reactants (a), (b), and (c) being so proportioned that heat available from the exothermic reaction (1) is substantially completely utilized to maintain the endothermic reaction (2).

MERLE RANDALL.

REFERENCES CITED

The following references are of record in the file of this patent:

UNITED STATES PATENTS

| Number | Name | Date |
|---|---|---|
| 908,051 | Voigt | Dec. 29, 1908 |
| 985,528 | Hoefer et al. | Feb. 28, 1911 |
| 1,030,916 | Ornstein | July 2, 1912 |
| 1,947,491 | Reilly | Feb. 20, 1934 |
| 2,034,292 | Grebe et al. | Mar. 17, 1936 |
| 2,139,219 | Basel et al. | Dec. 6, 1938 |
| 2,178,622 | Basel | Nov. 7, 1939 |
| 2,318,323 | Mueller-Cunradi et al. | May 4, 1943 |
| 2,442,324 | Heitz et al. | May 25, 1948 |
| 2,444,661 | Maude | July 6, 1948 |

FOREIGN PATENTS

| Number | Country | Date |
|---|---|---|
| 58,273 | Austria | Mar. 26, 1913 |
| 733,750 | Germany | Apr. 1, 1943 |